May 14, 1968    D. E. WILLEY    3,382,960

SELF-ADJUSTING FRICTION COUPLING WITH MAGNETIC RELEASE

Filed Jan. 16, 1967    3 Sheets-Sheet 1

INVENTOR.
DALE E. WILLEY

BY
John B. Sponsler

May 14, 1968 D. E. WILLEY 3,382,960
SELF-ADJUSTING FRICTION COUPLING WITH MAGNETIC RELEASE
Filed Jan. 16, 1967 3 Sheets-Sheet 3

United States Patent Office 3,382,960
Patented May 14, 1968

3,382,960
SELF-ADJUSTING FRICTION COUPLING
WITH MAGNETIC RELEASE
Dale E. Willey, Salem, Va., assignor to General Electric
Company, a corporation of New York
Filed Jan. 16, 1967, Ser. No. 609,485
7 Claims. (Cl. 192—90)

ABSTRACT OF THE DISCLOSURE

An electromagnetic brake or clutch having brake shoes mechanically coupled to a solenoid through a movable drawbar having pawls pivotally mounted thereon. The pawls engage serrated surfaces on brake shoe mounting members and cause the drawbar, pawls and brake shoes to move as a unit except when the brake shoes are being set. Due to inertia, the pawls pivot free temporarily of contact with the mounting members to permit the brake shoes to be set in a wear-compensated position. The pawls resume contact with the mounting member at a slightly different position to complete the self-adjusting procedure.

Background of the invention

In many industrial applications, electromagnetic coupling assemblies such as clutches or brakes may be preferred over mechanical assemblies. Examples of such applications are electrical elevators or cranes where an electromagnetic brake is connected in a motor circuit to cause friction braking of the motor whenever the motor is de-energized intentionally or accidentally due to a power loss. A solenoid is energized whenever the motor is energized and is mechanically linked to one or more brake shoes to cause the brake shoes to be released or removed from contact with a drum member on the motor shaft whenever it is energized. When the motor is de-energized, the solenoid becomes ineffective and springs set the brake shoes; i.e., urge them into contact with the drum member. Since the consistency of performance of the electromagnetic brake may vary as the lining on the brake shoes wears, manually adjusted mechanisms are often incorporated into the electromagnetic brake.

Summary of the invention

The present invention eliminates the manual step previously thought necessary and provides a coupling assembly which is automatically adjusted to compensate for wear of its friction members. In one embodiment, the present invention includes a cylindrical drum member and one or more friction members which may be biased into coupling contact with or set against the drum member by a suitable biasing means. The coupling assembly includes an actuating means having a pawl which can release the brake by withdrawing the friction member from coupling contact with the drum member against forces exerted by the biasing means. The actuating means also permits the friction member to be returned to coupling contact with the drum member by the forces exerted by the biasing means. The pawl is in gripping contact with the friction member at all times except when the friction member is resuming coupling contact with the drum member. During this short interval of time, the pawl is removed from contact with the friction member to allow the biasing means to force the friction member into a new position relative to the drum member to compensate for wear of the friction member.

Description of the preferred embodiment

Figure 1:
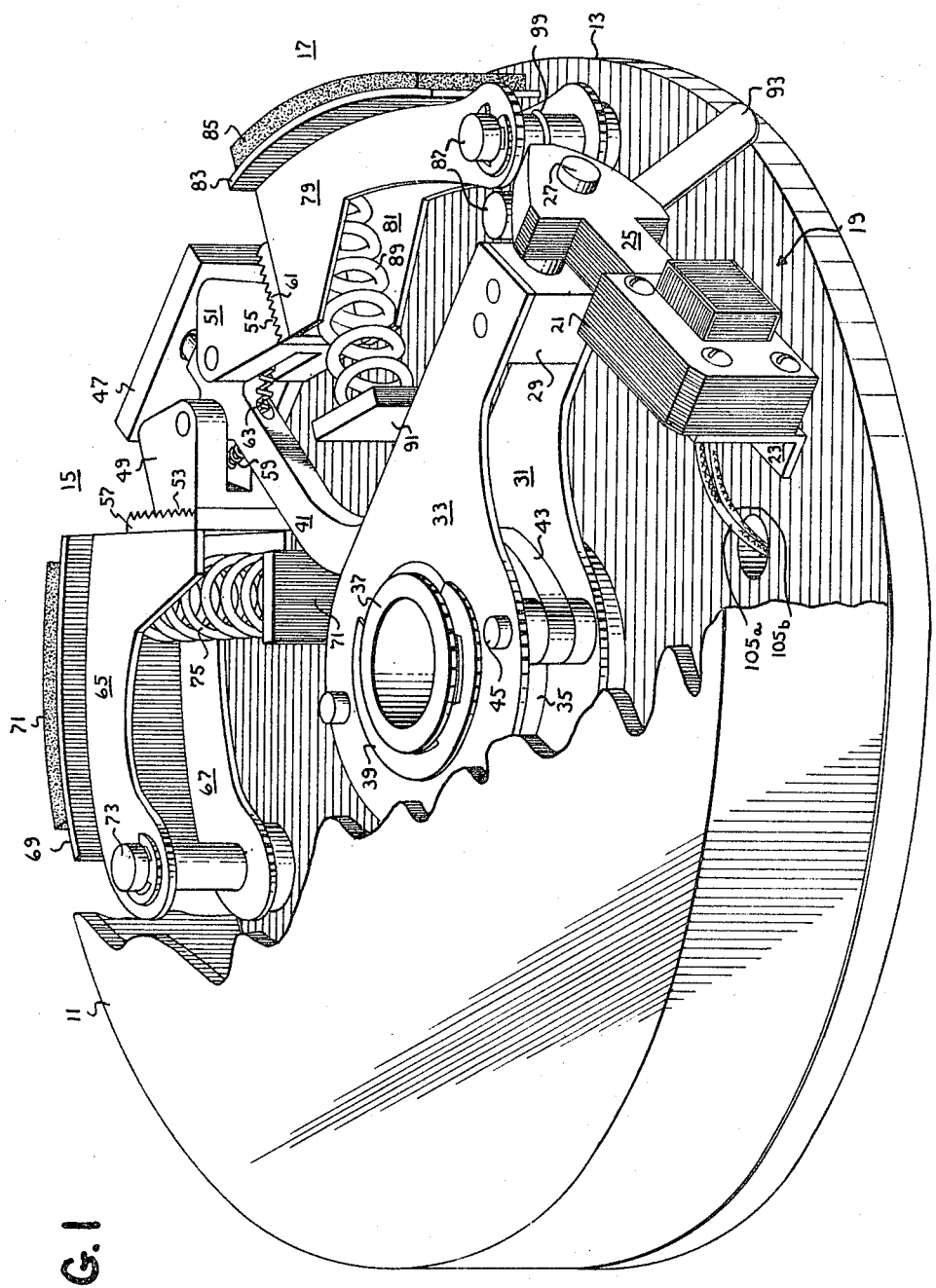
FIGURE 1 is a partially cut-away perspective view of an electromagnetic brake incorporating the present invention.

In FIGURE 1, an electromagnetic brake includes a cylindrical drum member 11 which may be selectively coupled to a relatively rotatable mounting plate 13 through friction members, such as brake shoes 15 and 17. To simplify the description of the electromagnetic brake, only one-half of the components of the brake are shown. In a preferred embodiment the brake includes a second pair of brake shoes similar to brake shoes 15 and 17 along with a mechanism for controlling the second set of brake shoes. These are hidden from view by the cover of the drum member 11. A solenoid 19 includes a stationary core and coil section 21 secured to the mounting plate 13 by a bracket 23 and a movable armature 25 to which an actuator pin 27 is connected. The core and coil section 21 is connected into a motor circuit by electrical conductors 105a and 105b. The actuator pin 27 extends from a spacing block 29 located between the outer ends of a pair of spaced actuator plates 31 and 33. The actuator plates 31 and 33, which are spaced at their inner ends by a hub spacer 35, are pivoted about a hub 37 secured to the mounting plate 13 by the armature 25, but are held from lateral movement by an E ring 39 on the hub 37.

A drawbar 41 having a curved inner end 43 is pivotally mounted between the actuator plates 31 and 33 by means of a pivot pin 45 at the inner end of the drawbar 41. The opposite end of the drawbar 41 extends partially through an aperture in a stop member 47 secured to the mounting plate 13. A pair of gripping pawls 49 and 51 having serrated gripping surfaces 53 and 55, respectively, are pivotally mounted on the drawbar 41 at the outer end thereof. The gripping pawl 49 is biased into contact with a gripping surface on a shoe ratchet 57 on brake shoe 15 by pawl biasing means such as pawl biasing spring 59. Similarly, the gripping pawl 51 is biased into contact with a shoe ratchet 61 on brake shoe 17 by pawl biasing spring 63.

The brake shoe 15, to which the shoe ratchet 57 is secured, consists of spaced pivot plates 65 and 67 between which is welded a shoe plate 69 having a wearable friction surface such as a lining 71 secured thereto. The brake shoe 15 is urged in a counterclockwise direction about a pivot pin 73 on the mounting plate 13 by a compression spring 75 sandwiched between the inner surface of the shoe plate 69 and a stop plate 77 secured to the mounting plate 13. The brake shoe 17 is identical to the brake shoe 15 with respect to its included elements. That is, the brake shoe 17 includes a pair of spaced pivot plates 79 and 81 between which a shoe plate 83 is welded. A wearable friction surface or lining 85 is secured to the outer surface of the shoe plate 83. The brake shoe 17 is urged about a pivot pin 87 by a compression spring 89 sandwiched between the inner surface of the shoe plate 83 and a stop plate 91 secured to the mounting plate 13.

Figure 2:
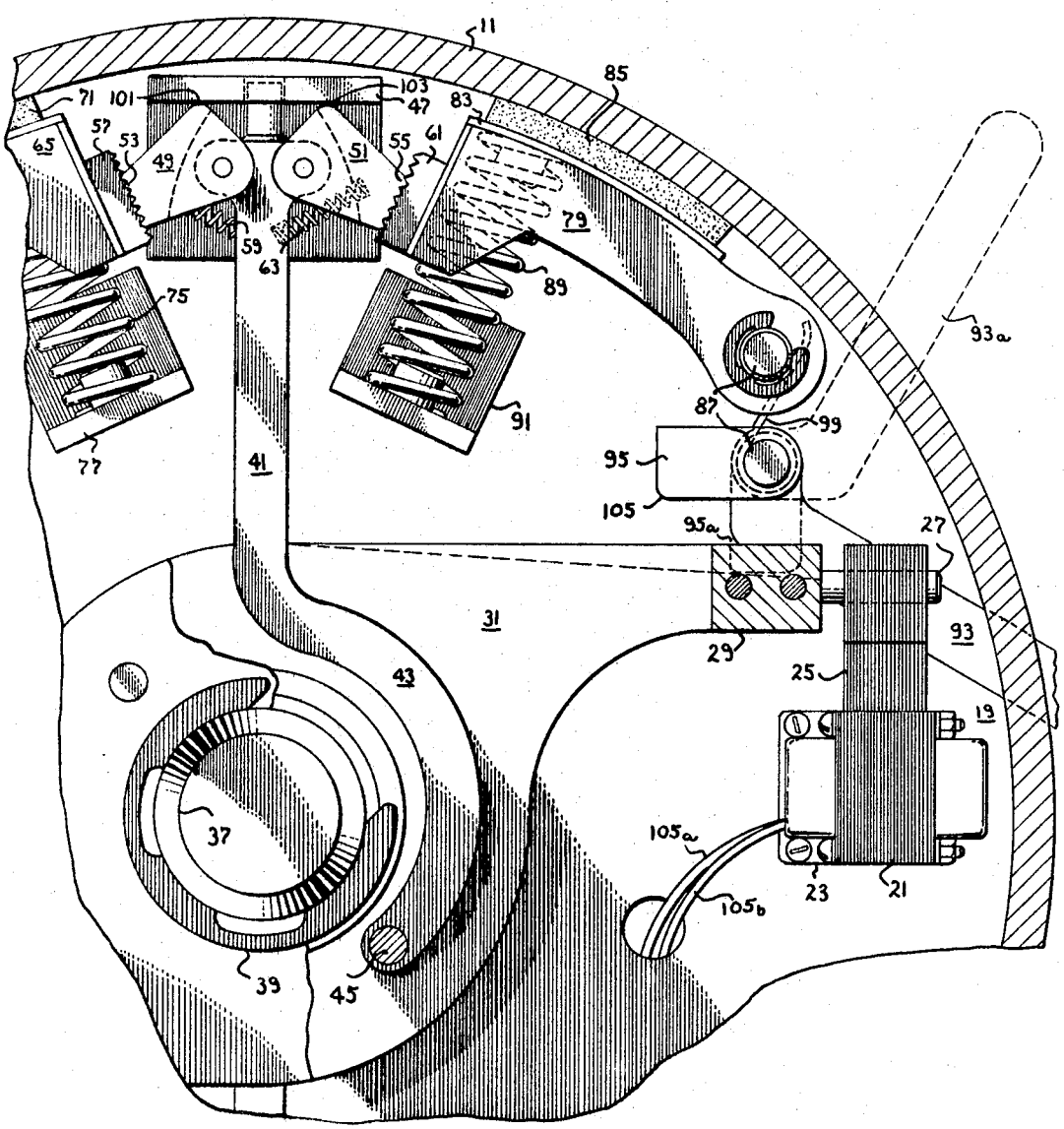
FIGURE 2 is a plan view of the electromagnetic brake of FIGURE 1 showing certain elements with greater clarity.

FIGURE 2 is largely similar to FIGURE 1 and is included primarily to show a manual release mechanism including a handle 93 protruding from the gap between the cylindrical drum member 11 and the mounting plate 13. The handle 93 includes an offset inner end 95 and is pivoted about a hub 97 secured to the mounting plate 13. A wire spring 99 anchored at one end about the pivot pin 87 normally holds the manual release mechanism in the position shown in solid lines in FIGURE 2. If it is necessary to use the manual release mechanism, the handle 93 is moved in a counterclockwise direction about the pivot pin 87 to the position shown in dotted lines in FIGURE 2. The operation of the manual release mechanism is described in greater detail following an explanation of the general operation of the brake.

In both FIGURES 1 and 2, the solenoid 19 is de-energized, a condition which exists whenever the motor with which the electromagnetic brake is associated is also de-energized. The lining 71 of the brake shoe 15 is forced into coupling contact with the inner surface of the cylindrical drum member 11 by the compressive action of compression spring 75. Similarly, the lining 85 of the brake shoe 17 is forced into coupling contact with the drum member 11 by the compression spring 89. Since the mounting plate 13 is stationary, the friction between the linings 71 and 85 and the cylindrical drum member 11 brakes the drum member 11 along with the motor shaft to which it is secured. The serrated gripping surfaces on gripping pawls 49 and 51 are biased into contact with the serrated surfaces on shoe ratches 57 and 61 due to the compressive action of the pawl biasing coil springs 59 and 63. The pawl biasing springs also force the camming surface 101 and 103 on the gripping pawls 49 and 51 lightly against the stop member 47.

Figure 3:
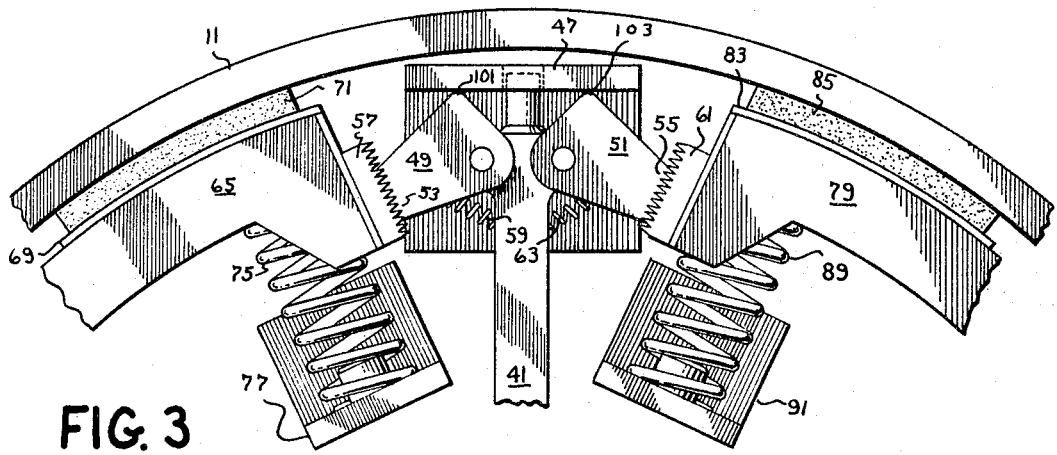
FIGURE 3 reveals the self-adjusting mechanism of the electromagnetic brake in its normal position with the brake set.
Figure 4:
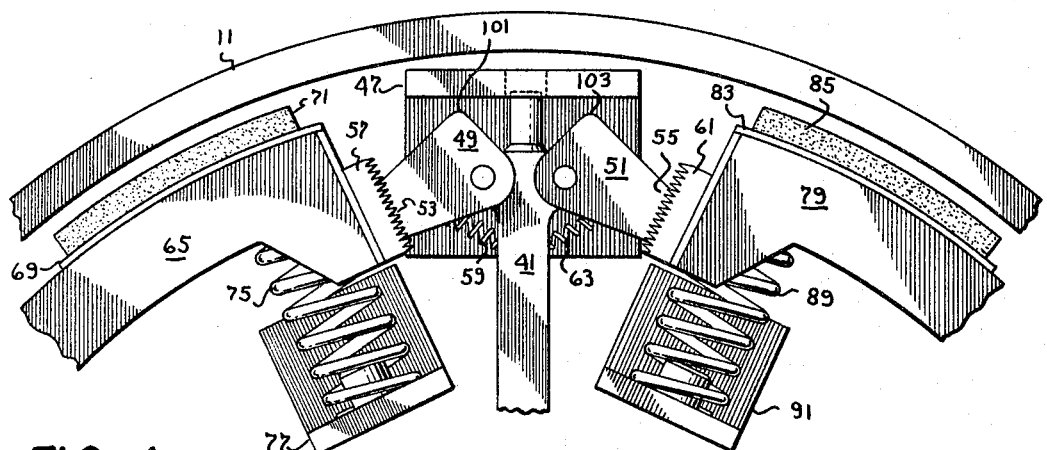
FIGURE 4 reveals the self-adjusting mechanism in its engaged position with the brake in the process of being released.

The relationship of the various elements when the brake is set is most clearly seen in FIGURE 3. Whenever the motor is energized, the brake is automatically released; i.e., the linings 71 and 85 are withdrawn from contact with the drum member 11 in the following manner. When the motor is energized the solenoid 19 is also energized through the conductors 105A and 105B. The energization of the solenoid 19 causes the armature 25 to be drawn into the core and coil section 21. The movement of the armature 25 causes the actuator plates 31 and 33 to be rotated in a clockwise direction about hub 37 so that the pivot pin 45 for the drawbar 41 is moved. The clockwise movement of the pivot pin 45 causes an inward movement of the drawbar 41 and of the gripping pawls 49 and 51. When the drawbar 41 is moving inwardly, the gripping pawls 49 and 51 move as a unit with it since the pawls abut the drawbar 41 near its outer end. Since the gripping pawls 49 and 51 engage the shoe ratchets 57 and 61, respectively, the inward movement of the gripping pawls 49 and 51 cause the shoe ratchets 57 and 61 and the brake shoes 15 and 17 to which they are attached to be moved inwardly against the force of the compression springs 75 and 89 bearing on the brake shoes. The linings 71 and 85 are withdrawn from contact with the drum member 11 so that the motor to which the drum member 11 is secured is free to operate. The drawbar 41 and the brake shoes 15 and 17 will remain in this non-coupling or released position as long as the solenoid 19 is energized.

Figure 5:
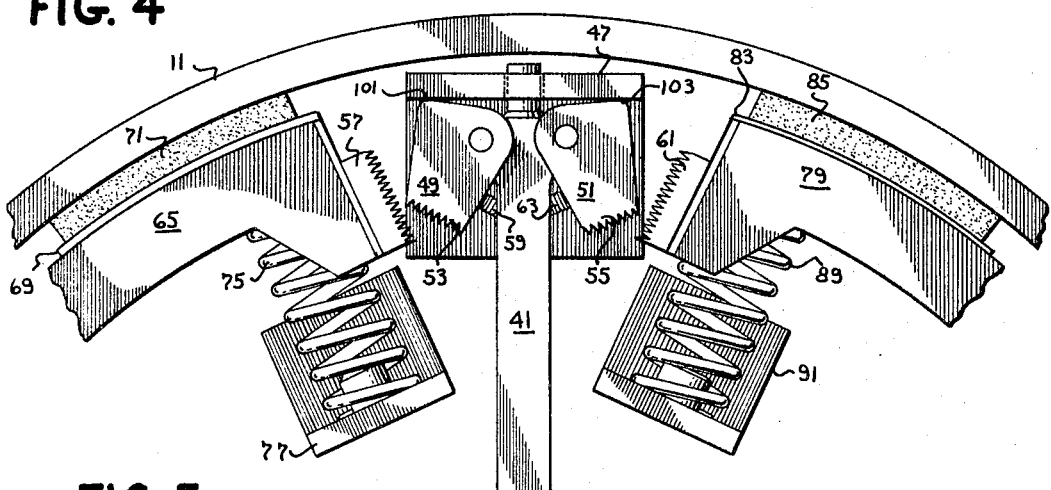
FIGURE 5 reveals the self-adjusting mechanism in its disengaged position as the brake is being set.

When the motor is de-energized either accidentally through a power loss or intentionally, the solenoid 19 is ineffective to hold the brake shoes 15 and 17 in their withdrawn position. The compression springs 75 and 89 force the brake shoes 15 and 17 outwardly until the linings 71 and 85 contact the inner surface of the drum member 11. While the brake shoes 15 and 17 are moving outwardly, they drag the drawbar 41 along with them due to the engagement of the gripping pawls 49 and 51 with the shoe ratchets 57 and 61. The brake shoes 15 and 17 come to a stop when their linings 71 and 85 contact the drum member 11, but the inertia of the drawbar 41 and the gripping pawls 49 and 51 causes these elements to continue to move outwardly. As may be seen in FIGURE 5, the drawbar 41 moves past its normal coupling position and continues to move until the gripping pawls 49 and 51 have been rotated to their maximum extent due to contact between their camming surfaces 101 and 103, respectively, and the stop member 47. As the gripping pawl 49 approaches the limits of its counterclockwise movement, it is pivoted free of contact with the shoe ratchet 57. Similarly, the pawl 51 is pivoted free of contact with the shoe ratchet 61 as it approaches the limits of its clockwise movement. When the pawls pivot free, the compression springs 75 and 89 are free to seat the linings 71 and 85 against the drum member 11.

The compressive forces exerted by the pawl biasing spring 59 when cause the gripping pawl 59 to rotate in a clockwise direction until it once again engages the shoe ratchet 57. The gripping pawl 51 is biased in a counterclockwise direction in the same manner until it engages shoe ratchet 61.

It will be seen that as the linings 71 and 85 begin to wear due to repeated brake applications, the positions of the shoe ratchets 57 and 61 change with respect to the positions of their respective gripping pawls 49 and 51. That is, when the brake linings are new and the brake shoes 15 and 17 are located at a maximum radially inward position, the gripping pawls are seated at the outer ends of their respective shoe ratchets. As the brake linings wear, the brake shoes 15 and 17 move radially outward as do the shoe ratchets 57 and 61. Since the gripping pawls 49 and 51 always move in the same paths over the surface of the stationary mounting plate 13, these pawls "move" inwardly along the serrated surfaces of the shoe ratchets 57 and 61 as the brake linings wear. Since the brake is self-adjusting in the foregoing manner, it will continue to operate and to be actuated uniformly and consistently.

Where the electric motor with which the electromagnetic brake is used operates an elevator or a crane hoist, the manual release mechanism may be necessary in order to partially or completely release the brake to permit the elevator or the hoisted load to descend when the motor is de-energized and the brake is set due to an accidental power loss. The operation of the manual release mechanism is explained with reference to FIGURE 2. When the brake is set, the actuator plates 31 and 33 and the spacing block 29 are at their maximum counterclockwise positions. Normally, the position of the brake handle is that shown in solid lines. If, however, the manual release mechanism is to be used to release the brake, the handle 93 is pivoted in a counterclockwise direction to the position 93A to bring the inner end 95 into the position 95A against the spacing block 29. The inner end 95 forces the spacing block 29 to move clockwise a short distance, and the pivot pin 45 for the drawbar 41 to retract, thereby withdrawing the brake linings 71 and 85 from contact with the cylindrical drum member 11. The brake handle is maintained at its position 93A since the compression springs 75 and 89 tend to force the drawbar 41 and consequently the spacing block 29 in a counterclockwise direction or against the flat surface of the inner end 95 at its position at 95A. If the brake should not be completely released, the handle 93 may be rotated in a counterclockwise direction until the rounded surface 105 on the inner end 95 forces the spacing block 29 clockwise a short distance to lessen the spring forces biasing the linings 71 and 85 against the drum member 11 until the desired amount of frictional contact between the brake linings 71 and 85 and the cylindrical drum member 11 is produced.

The manual release mechanism must be automatically reset when, upon the restoration of power, the solenoid 19 is again energized. Otherwise, any subsequent de-energization of the solenoid 19 would result in the spacing block 29 being returned into position against the inner end 95 of the manual release mechanism, and the brakes would remain released rather than being automatically set. The handle 93 is automatically returned to its normal position by the clockwise force exerted by the wire spring 99. While the forces exerted by the wire spring 99 exist at all times, they are sufficient to cause movement of the handle 93 only when there is no contact between the inner end 95 and the spacing block 29.

From the aforegoing description, it may be seen that the present invention provides a coupling assembly which is completely self-adjusting and which requires no manual adjustments at any time. This self-adjusting feature is significant not only during actual use of the coupling assembly but also during its manufacture since the feature obviates the need for making adjustments of the brake shoe positions during the manufacturing process.

While there has been described at present what is regarded as a preferred embodiment of the present invention, it will be apparent that modifications and variations therein will occur to those skilled in the art. For instance, while the foregoing detailed description is drawn to an electromagnetic brake, it is obvious that the same structure could be used as a clutch merely by locating the cylindrical drum member 11 on one member and the brake shoe assembly on a second member to be coupled to the first member. Therefore, it is intended that the appended claims shall cover all such variations and modifications as fall within the true spirit and scope of the invention.

I claim:

1. A self-adjusting coupling assembly including:
   (a) a cylindrical drum member;
   (b) a friction member capable of assuming coupling contact with said drum member;
   (c) a biasing means acting on said friction member for effecting coupling contact between said friction member and said drum member; and
   (d) an actuating means including a pawl for withdrawing said friction member from coupling contact with said drum member against forces exerted by said biasing means and for permitting said friction member to return to coupling contact with said drum member, said pawl being in gripping contact with said friction member at all times except when said friction member is resuming coupling contact with said drum member.

2. A self-adjusting coupling assembly as recited in claim 1 wherein said actuating means includes a solenoid for causing the withdrawal of said friction member from coupling contact with said drum member.

3. A self-adjusting coupling assembly as recited in claim 2 wherein said actuating means further includes a drawbar connected to said pawl and to said solenoid, said drawbar being retractable upon the energization of said solenoid to cause said pawl to withdraw said friction member from coupling contact with said drum member.

4. A self-adjusting coupling assembly as recited in claim 3 wherein said pawl member is pivotally mounted on said drawbar and moves as a unit therewith until said friction member resumes coupling contact with said drum member after de-energization of said solenoid whereupon said pawl is temporarily pivoted free of gripping contact with said friction member.

5. A self-adjusting coupling assembly including:
   (a) a cylindrical drum member;
   (b) a mounting plate rotatable relative to said cylindrical drum member;
   (c) a friction member pivotally mounted on said mounting plate and including
      (1) a wearable friction surface engageable with said cylindrical drum member and
      (2) a gripping surface;
   (d) a spring biasing means secured to said mounting plate and acting on said friction member to bias said wearable friction surface into coupling contact with said cylindrical drum member;
   (e) a drawbar secured to said mounting plate and movable between a coupling position and a non-coupling position;
   (f) a gripping pawl pivotally mounted on said drawbar, said pawl being in contact with said gripping surface and movable as unit with said drawbar when said drawbar is moving between its coupling and non-coupling positions;
   (g) means for moving said drawbar into its non-coupling position against the forces exerted by said spring biasing means whereby said wearable friction surface is removed from coupling contact with said cylindrical drum member, said moving means being adapted to be rendered ineffective under predetermined conditions to permit said spring biasing means to move said drawbar toward and temporarily beyond its coupling position, said pawl being pivoted free of contact with said gripping surface when said drawbar moves beyond its coupling position;
   (i) pawl biasing means for causing said pawl to resume contact with said gripping surface after said spring biasing means has biased said wearable friction surface into coupling contact with cylindrical drum member.

6. A self-adjusting coupling assembly as recited in claim 5 wherein said moving means includes an electric solenoid having a movable armature mechanically connected to said drawbar, said armature being movable upon the energization of said solenoid to move said drawbar into its non-coupling position.

7. A self-adjusting coupling assembly as recited in claim 5 wherein said camming means includes:
   (a) a camming surface on said gripping pawl, and
   (b) a stop member affixed to said mounting plate in the path of travel of said drawbar and said gripping pawl, said stop member acting against said camming surface when said drawbar moves temporarily beyond its coupling position to cause said pawl member to be pivoted free of said gripping surface.

References Cited

UNITED STATES PATENTS

| | | | |
|---|---|---|---|
| 1,922,054 | 8/1933 | Magee et al. | 192—111 X |
| 2,392,188 | 1/1946 | Rauch | 192—111 X |
| 3,249,182 | 5/1966 | O'Reilly | 188—78 |

BENJAMIN W. WYCHE III, *Primary Examiner.*